J. W. MORRIS.
TWINE HOLDER.
APPLICATION FILED MAY 18, 1909.
953,280.
Patented Mar. 29, 1910.
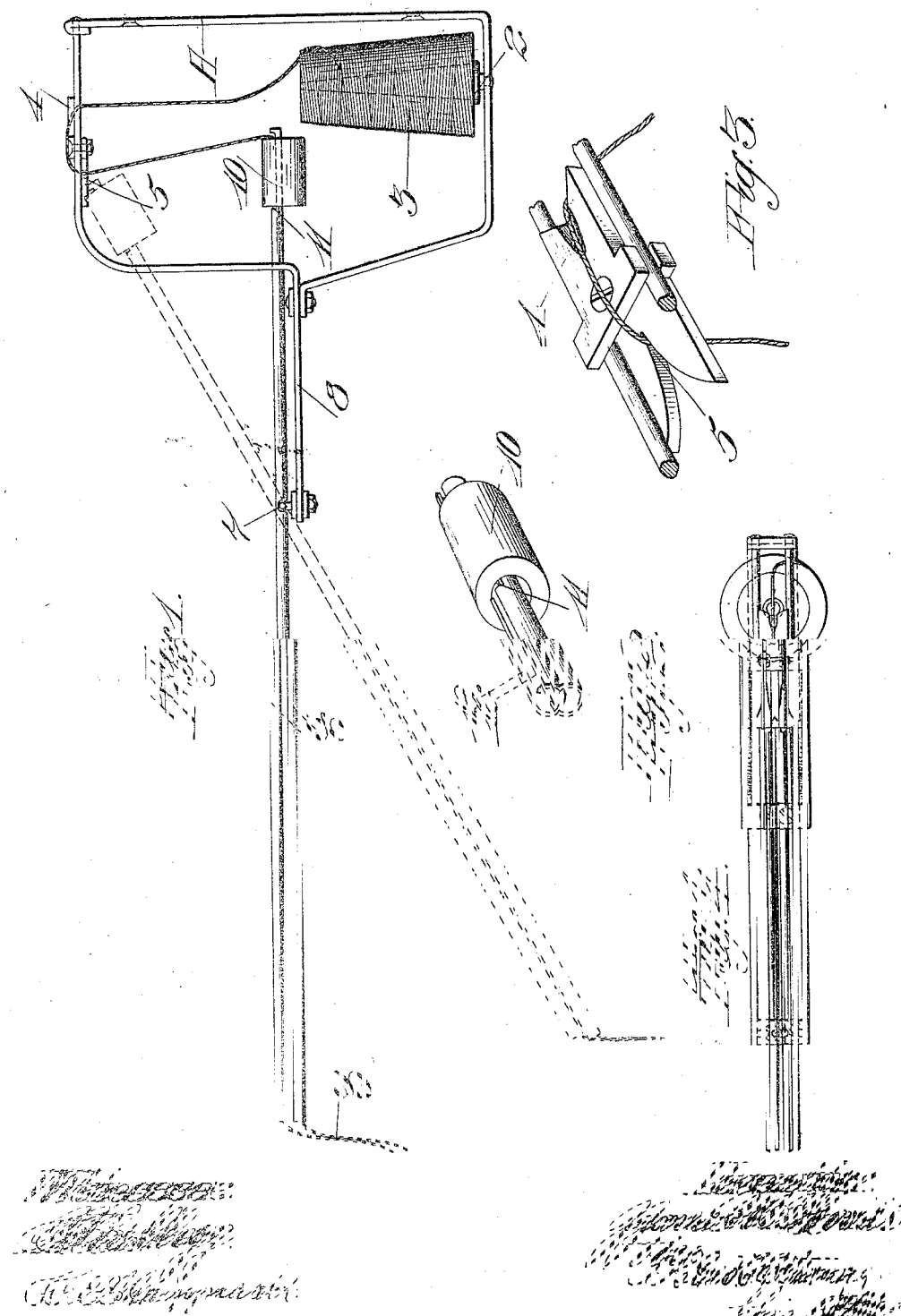

UNITED STATES PATENT OFFICE.

JAMES W. MORRIS, OF OAKLAND, CALIFORNIA.

TWINE-HOLDER.

953,280.

Specification of Letters Patent.   Patented Mar. 29, 1910.

Application filed May 18, 1909.  Serial No. 496,793.

*To all whom it may concern:*

Be it known that I, JAMES W. MORRIS, citizen of the United States, residing at Oakland, in the county of Alameda and State of California, have invented new and useful Improvements in Twine-Holders, of which the following is a specification.

My invention relates to twine holders. Its object is to provide a simple, cheap, practical store-service device for holding twine; in which the twine may be supported at any suitable point and led within convenient reach of the user; and whenever a piece of twine is broken off the slack will be taken up substantially in the manner hereinafter shown and described.

The invention consists of the parts and the construction and combination of parts as hereinafter more fully described and claimed, having reference to the accompanying drawings, in which—

Figure 1 is a side elevation representing the invention. Fig. 2 is a detail of the guide sleeve and counterweight. Fig. 3 is a perspective of the forked guide for guiding and gripping the twine. Fig. 4 is a plan of the holder.

A represents a bracket of any suitable description, made of any suitable material, and adapted to be secured to any suitable support by any appropriate means. Ordinarily it may be attached direct to the shelving behind the counter. This holder is provided with a suitable spindle 2 for supporting a ball or a cone 3 of twine, the end of the twine being led up to the top of the bracket and through the members composing the same, and over a plate 4 suitably clamped to the top of the bracket, thence down again through a V-shaped slot 5 formed in the front end of the plate 4. From the plate 4 the end of the twine is passed through a slotted tube 6, which is fulcrumed at 7 on an arm 8 which extends out from the bracket in the direction of the counter. The tube 6 is of sufficient length to direct the twine over the counter so that the free end of the twine, represented at 9, will be in convenient reach of the operator. The inner end of the tube 6 works in the space formed by the members of the bracket A so as to keep the tube from moving sidewise, but allowing it a free vertical, pivotal motion, as indicated by the full and dotted line positions of Fig. 1. The pivotal movement of the tube is limited in suitable fashion by the bracket construction.

The inner end of the tube carries a weighted sleeve member 10, which slips loosely over the end of the tube, but is limited from passing too far thereon by the shoulders 11 formed on top of the tube, the tube being slotted on top, as shown at 12, to allow the end of a fresh ball of twine to be easily threaded into the tube. The weighted sleeve 10 performs a double function, both as an inclosing guide for the string at the inner slotted end of the tube so as to insure the twine being led through the sleeve, and also as a counter-weight to maintain the tube normally horizontal.

In operation, the twine having been passed through the tube by simply slipping it into the slot 12 in the tube and then passing the weighted sleeve 10 over the inner end of the tube, the device will normally assume the full-line position shown in Fig. 1.

Whenever it is desired to pull off a piece of twine from the cone, the operator seizes the free end 9 of the twine and pulls down on it, thereby causing the tube 6 to assume the dotted line position of Fig. 1, lifting the weight 10 until it strikes the top of the bracket and with the twine then extending straight over the plate 4, and down through the tube. This releases the twine from the gripping notch 5 so that the twine can easily be drawn through the tube. The moment, however, the twine is broken off or slackened at the outer end of the tube, the latter falls back into normal horizontal position, and in so-doing the twine which passes over the plate 4 is gripped in the V-shaped notch 5 and no more twine is drawn off the roll for the time being, but the excess length of the loose end of the twine 9 is drawn up out of the way of the operator, yet at the same time to be within ready reach the next time he needs a piece of twine.

Having thus described the invention, what I claim and desire to secure by Letters-Patent, is—

1. A twine holder comprising in combination a suitable support for a ball of twine, a tube slotted on its upper sides throughout substantially its length through which the end of the twine is passed, and a twine gripping means between said tube and the ball of twine, said tube being counterweighted and said twine being releasable from the gripping means when the twine is drawn forth through said tube.

2. In a twine holder, the combination of a bracket adapted to be secured to the wall, carrying a support for a ball of twine, a pivoted slotted tubular guide on the bracket, and a member carried by the inner end of the guide and forming both a counterweight for the guide and a guide for the twine.

3. The combination with a suitable support, of a tube slotted on its upper side throughout its length, a loose sleeve and counterweight fitting the inner ends of said tube, and a twine guide normally positioned above said sleeve.

4. A twine holder comprising a bracket member and a tube slotted on its upper side pivoted to said bracket member and turnable in a vertical plane, a counterweight member on said tube to maintain it normally horizontal, and also serving to hold the twine in the tube, and direction means for the twine adjacent to but supported independently of the counterweighted end of the tube.

5. In a twine holder, the combination of a suitably supported tube pivoted between its ends, said tube being slotted on its upper side throughout its length, means for limiting the pivotal movement of said tube, a weighted sleeve member loosely mounted on one end of the tube for maintaining the tube normally at its limit of movement in one direction, said tube forming a guide for the twine, and twine directing means adjacent to the opposite limit of movement of the tube, and the end of the twine passed over said direction means and through the tube.

6. In a twine holder, the combination of a suitably supported tube pivoted between its ends, counterweight member on the tube forming a guide for the twine, means for limiting the pivotal movement of said tube, a weighted sleeve member loosely mounted on one end of the tube for maintaining the tube normally at its limit of movement in one direction, said tube forming a guide for the twine, and twine directing means adjacent to the opposite limit of movement of the tube, and the end of the twine passed over said direction means and through the tube, said twine direction means having means for gripping the twine when said tube is at its opposite limit of movement.

In testimony whereof I have hereunto set my hand in presence of two subscribing witnesses

JAMES W. MORRIS.

Witnesses:
CHARLES A. PENFIELD,
CHARLES EDELMAN.